P. CONNIFF.
METALLIC PACKING.
APPLICATION FILED MAR. 22, 1911.

1,035,859.

Patented Aug. 20, 1912.

Witnesses
F. C. Gibson
C. C. Hines

Inventor
Philip Conniff.
By Victor J. Evans
Attorney

UNITED STATES PATENT OFFICE.

PHILIP CONNIFF, OF WASHINGTON, DISTRICT OF COLUMBIA.

METALLIC PACKING.

1,035,859.  Specification of Letters Patent.  Patented Aug. 20, 1912.

Application filed March 22, 1911. Serial No. 616,068.

*To all whom it may concern:*

Be it known that I, PHILIP CONNIFF, a citizen of the United States, residing at Washington, in the District of Columbia, have invented new and useful Improvements in Metallic Packings, of which the following is a specification.

This invention relates to metallic packings for piston rods, valve stems and the like, and its object is to provide a simple, reliable and efficient construction and arrangement of packing which comprises a minimum number of parts, which will form a tight joint and automatically adjust itself to compensate for wear, and which is adapted to have sufficient vibratory movement to compensate for any lateral vibratory play of the rod or stem, whereby a tight joint will be maintained and objectionable binding of the parts prevented.

The invention consists of the features of construction, combination and arrangement of parts, hereinafter fully described and claimed, reference being had to the accompanying drawings, in which:—

Figure 1:
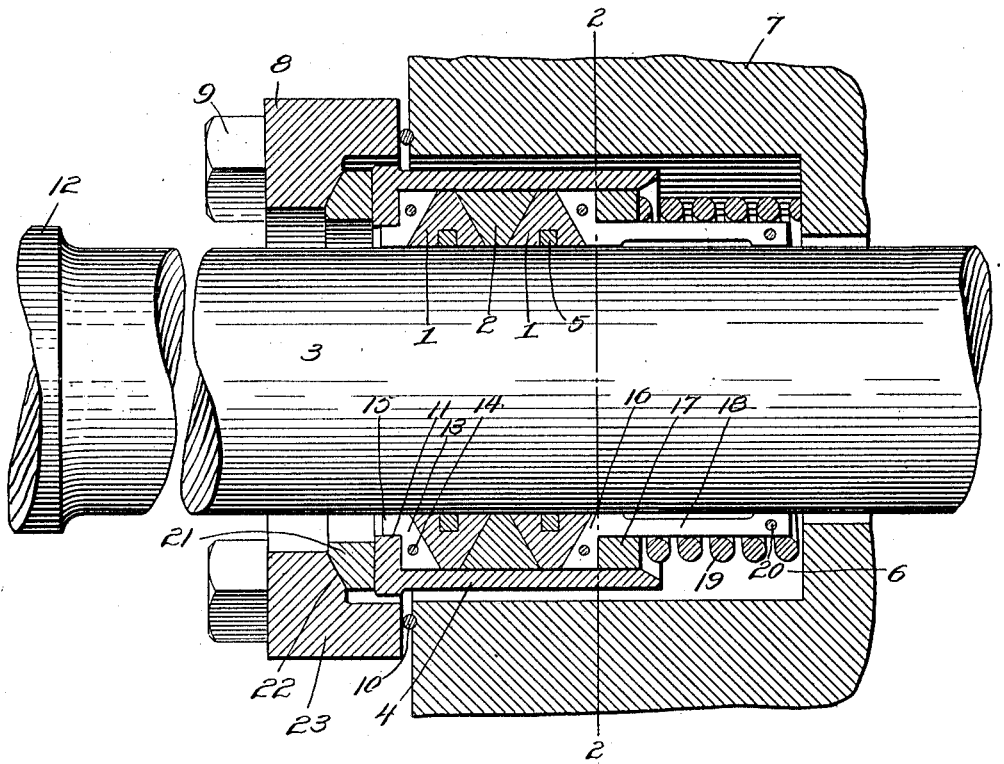
Figure 2:
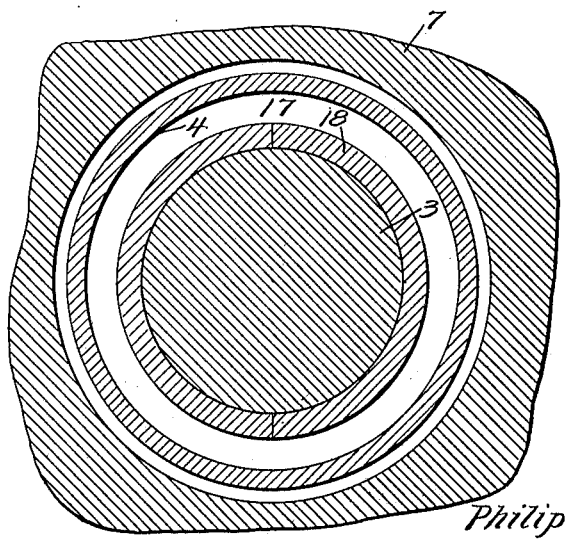

Figure 1 is a longitudinal section of the improved packing applied to a piston rod. Fig. 2 is a cross section on the line 2—2 of Fig. 1.

In carrying my invention into practice, I provide a series of three or more packing rings of Babbitt or other suitable anti-friction metal. These rings are solid or substantially so and are of pyramidal or triangular form in cross section. The outer rings 1 of the series have their bases disposed inwardly, while the central or intermediate ring 2 has its base disposed outwardly and is arranged to fit within the wedge-shaped space formed between said rings 1 with its inclined sides bearing against the proximate inclined inner faces of the rings 1. The inner face or apex of the central ring is truncated to lie flush with the bases of the outer rings and to bear therewith against the surface of the piston rod 3, while the outer faces or apices of the outer rings are similarly truncated to lie flush with the base of the central ring and to bear therewith against the surface of a casing or cup 4 in which the rings are contained. The inner faces or bases of the rings 1 are annularly recessed to receive lubricating metallic rings 5, formed of any suitable composition or alloy of metals having anti-friction properties, whereby an easy and free movement of the rod through the packing is insured. The pyramidal form of the rings adapts them to adjust themselves automatically to compensate for wear under the pressure to which they are subjected, and to promote this adjusting action the internal wall of the casing or cup 4 may be longitudinally tapered to a slight degree to adapt the rings to be pressed against the rod under the forcing action of the feed spring.

The cup or casing 4 is arranged mainly within a chamber 6 in the cylinder head or stuffing box 7 and is held in place by a suitable gland 8 secured to the cylinder head by bolts 9. A packing gasket 10 of suitable material is interposed between the cylinder head and gland to prevent the escape of the steam or motive fluid, as shown. The outer end of the cup projects beyond the cylinder head and into the gland and is formed with an inwardly extending flange 11 of greater diameter than the shouldered end 12 of the rod, by which the cup is adapted to be slipped into place over such end of the rod. The flange 11 also forms an abutment for engagement by a bearing ring 13 having a beveled face to bear against the outer inclined face of the adjacent ring 1 and a straight face to bear against the inner face of the flange. Said ring 13 is preferably made of two or more sections united by coupling pins or bolts 14, and is provided with a joint closing flange 15 to project into the space between the rod and flange 11 to close the same against the escape of the steam or motive fluid. A similar bearing ring 16, having an inclined inner face to engage the outer beveled face of the other ring 1, is fitted within the rear end of the cup or casing and provided with an outer straight face engaged by a pressure ring 17, also of sufficient diameter to be slipped over the shouldered portion 12 of the rod. The ring 16 is integral with the outer end of a collar or sleeve 18 inclosing the rod beyond the inner end of the cup, about which collar is arranged the coiled pressure spring 19 bearing terminally against the ring 17 and inner end wall of the chamber 6. The ring 16 and collar 18 are preferably integral with each other and made in sections connected by suitable fastenings 20.

The flange 11 forms an abutment to engage a bearing ring 21 disposed within the gland and having an outer spherical face engaging the correspondingly-shaped face 22 of a bearing flange or shoulder 23 formed within the gland, whereby the outward movement of the packing under the pressure of the spring 19 is limited. The packing as a whole is of less diameter than the chamber 6 and portion of the gland containing the flange 11 and ring 21 and is sustained in position by its bearing contact with the piston rod. As a result of this construction and arrangement a clearance space is formed between the packing and wall of the stuffing box as a whole, by which the packing is permitted to tilt or vibrate on the spherical surfaces of the ring 21 and shoulder 22 as a fulcrum, to adapt the packing to accommodate itself without resistance to any lateral play or vibrations of the piston rod. It will also be observed that the construction is such as to secure, in addition to an automatic adjustment of the parts to compensate for wear, ease and facility in applying and removing the parts of the packing. Through the capability of the packing to vibrate with the piston rod, a tight joint is always maintained, as the parts are relieved from the excess pressure which would otherwise fall upon them as a result of the vibratory movements of the rod.

Having thus described the invention, I claim:—

1. In a metallic packing, the combination of a stuffing box, a gland secured thereto, a rod extending through the stuffing box and gland, a cup disposed within the stuffing box and projecting at one end into the gland, said cup being provided at the latter-named end with an inturned flange spaced from the rod, a ring arranged between the flanged end of the cup and the gland, outer frusto pyramidal packing rings inclosed in the cup and having its apex inwardly disposed and its inclined sides arranged in bearing contact with the juxtaposed inclined sides of the outer packing rings, said rings having their inner and outer surfaces flush with each other and bearing respectively against the rod and wall of the cup, bearing rings having inner inclined faces engaging the outer inclined faces of the outer bearing rings, one of said bearing rings being arranged to engage the flange of the cup and provided with a flange projecting into the space between the rod and flanged portion of the cup, a collar surrounding the rod and connected with the other bearing ring, a ring surrounding said collar within the inner end of the cup and engaging the adjacent bearing ring and a pressure spring between said ring and the inner end of the stuffing box and surrounding said collar.

2. In a metallic packing, the combination of a stuffing box open at its outer end, a gland secured to the outer end of the stuffing box and provided with a spherical surface, a rod having a shouldered surface and a portion of less diameter than said surface extending through the stuffing box and gland, a fulcrum ring within the gland having a spherical surface engaging the surface of the gland, a cup arranged within and of less diameter than the stuffing box, said cup having its outer end projecting into the gland and bearing against the fulcrum ring and provided with an inturned annular flange spaced from the rod and of greater diameter than the shouldered portion thereof, a series of frusto pyramidal packing rings arranged within the cup and bearing on the rod, sectional bearing rings arranged within the cup and engaging the inclined sides of the outer packing rings, the inner bearing ring being provided with a collar and the outer bearing ring with a flange projecting into the space between the rod and flange of the cup, a pressure ring engaging the inner bearing ring and inclosing the collar within the inner end of the cup, and a pressure spring surrounding the collar between said pressure ring and the inner end of the stuffing box.

In testimony whereof I affix my signature in presence of two witnesses.

PHILIP CONNIFF.

Witnesses:
C. C. HINES,
E. EDMONSTON, Jr.

---

Copies of this patent may be obtained for five cents each, by addressing the "Commissioner of Patents, Washington, D. C."